(12) United States Patent
Litvin et al.

(10) Patent No.: US 9,106,916 B1
(45) Date of Patent: Aug. 11, 2015

(54) SATURATION INSENSITIVE H.264 WEIGHTED PREDICTION COEFFICIENTS ESTIMATION

(75) Inventors: Yevgeni Litvin, Haifa (IL); Eran Pinhasov, Zichron Yaakov (IL)

(73) Assignee: QUALCOMM Technologies, Inc., San Diego, CA (US)

( * ) Notice: Subject to any disclaimer, the term of this patent is extended or adjusted under 35 U.S.C. 154(b) by 492 days.

(21) Appl. No.: 13/253,922

(22) Filed: Oct. 5, 2011

Related U.S. Application Data

(60) Provisional application No. 61/408,068, filed on Oct. 29, 2010.

(51) Int. Cl.
*H04N 19/107* (2014.01)
*H04N 19/176* (2014.01)

(52) U.S. Cl.
CPC .................................. *H04N 19/176* (2014.11)

(58) Field of Classification Search
None
See application file for complete search history.

(56) References Cited

U.S. PATENT DOCUMENTS

| | | | |
|---|---|---|---|
| 7,477,689 B2 * | 1/2009 | Karczewicz et al. | 375/240.03 |
| 7,502,415 B2 * | 3/2009 | Lin et al. | 375/240.18 |
| 7,515,637 B2 | 4/2009 | Payson | |
| 7,532,808 B2 | 5/2009 | Lainema | |
| 8,031,237 B2 * | 10/2011 | Kirisawa | 348/228.1 |
| 8,126,266 B2 * | 2/2012 | Kimura et al. | 382/170 |
| 8,248,537 B2 * | 8/2012 | Kimura et al. | 348/701 |
| 8,279,924 B2 * | 10/2012 | Chen et al. | 375/240.03 |
| 2005/0013373 A1 * | 1/2005 | Lin et al. | 375/240.18 |
| 2005/0185715 A1 * | 8/2005 | Karczewicz et al. | 375/240.12 |
| 2007/0046789 A1 * | 3/2007 | Kirisawa | 348/226.1 |
| 2007/0237221 A1 * | 10/2007 | Hsu et al. | 375/240.03 |
| 2007/0248163 A1 * | 10/2007 | Zuo et al. | 375/240.2 |
| 2008/0106647 A1 * | 5/2008 | Kimura et al. | 348/607 |

(Continued)

FOREIGN PATENT DOCUMENTS

WO WO-2010054585 5/2010

OTHER PUBLICATIONS

Boyce, J. M. Weighted prediction in the H.264/MPEG AVC video coding standard, Proc. International Symposium on Circuits and Systems ISCAS '04, 2004, 3, III-789-92, <http://ieeexplore.ieee.ora/xpls/abs_all.jsp?arnumber=1328865>.

(Continued)

*Primary Examiner* — Dave Czekaj
*Assistant Examiner* — Kehinde O Abimbola
(74) *Attorney, Agent, or Firm* — Knobbe, Martens, Olson & Bear, LLP

(57) ABSTRACT

A system, method, and computer program product for saturation insensitive weighted prediction coefficients estimation for video coding. The saturated pixels in frames of an input video are excluded from consideration in estimating weighted prediction coefficients that are then used to encode the input video. The saturated pixels include those having luma and/or chroma values above or below limits, and may be identified by use of a histogram. The saturated pixels may also be found by analyzing a lower resolution version of the frames, and/or sampling pixels in the frames. Embodiments enable improved video quality for a given bit rate, and increased coding efficiency, particularly for input video including frames with rapid pixel value changes. Separate portions of the frames may be processed separately, and the embodiments may execute within an optimization loop that minimizes a predetermined error function. The encoding format may include the H.264/AVC standard.

23 Claims, 5 Drawing Sheets

(56) References Cited

U.S. PATENT DOCUMENTS

| | | |
|---|---|---|
| 2008/0130750 A1 | 6/2008 | Song |
| 2008/0225946 A1 | 9/2008 | Yin et al. |
| 2008/0260270 A1 | 10/2008 | Lainema |
| 2008/0292185 A1* | 11/2008 | Kimura et al. ............... 382/172 |
| 2009/0295938 A1 | 12/2009 | Nikkanen |
| 2010/0020870 A1 | 1/2010 | Jeon et al. |
| 2010/0086025 A1* | 4/2010 | Chen et al. ............... 375/240.03 |
| 2010/0183071 A1* | 7/2010 | Segall et al. ............ 375/240.16 |
| 2010/0316113 A1* | 12/2010 | Jang et al. .................... 375/240 |

OTHER PUBLICATIONS

Kato, H., Nakajima, Y. Weighting factor determination algorithm for H.264/MPEG-4 AVC weighted prediction, Proc. IEEE 6th Workshop on Multimedia Signal Processing, 2004, 27-30, <http://ieeexplore.ieee.org/xpls/abs_all.jsp?arnumber=1436407>.

Suehring, K. H.264 / AVC reference software, Version 16.2, <hhtb://iphome.hhi.de/suehring/tml/>.

* cited by examiner

INCREASING SATURATION

SATURATION INSENSITIVE H.264 WEIGHTED PREDICTION COEFFICIENTS ESTIMATION

CROSS REFERENCE TO RELATED APPLICATIONS

This application is based upon and claims the benefit under 35 U.S.C. 119(e) of commonly-assigned U.S. provisional application Ser. No. 61/408,068, filed Oct. 29, 2010, and entitled "Saturation Insensitive H.264 Weighted Prediction Coefficients Estimation", which is hereby incorporated by reference in its entirety.

FIELD OF THE INVENTION

This patent application relates in general to coding of digital video material, and more specifically to weighted prediction error coding for video compression and distribution formats such as the H.264/AVC standard.

BACKGROUND OF THE INVENTION

Most video coding algorithms, including the H.264/AVC video coding standard, use temporal redundancy of images in consequent frames to reduce the size of a coded bit stream. A reference frame is a previously coded frame and the target frame is a frame currently being coded. Only the difference (i.e. residual) between the reference frame and a target frame is coded. Since the reference frame is often very similar to the target frame, great bandwidth savings may thus be achieved.

A video scene often contains moving objects. In order to minimize the residual between reference images and target images, a motion estimation (ME) process is used in order to find a better match between reference images and target images. This process is typically done at block granularity, yielding a motion vector (MV) for every block of the target image, that describes movement between the target image and reference image. These motion vectors are also coded into the bit stream.

Motion compensation (MC) uses the motion vectors described above to create an improved reference image, block by block, by taking parts from the original reference image and creating a motion compensated reference image. In cases where the motion vectors are in sub-pixel resolution, pixels may be interpolated. The improved reference image will then yield a smaller residual when subtracted from the target image. Thus, by compensating for image differences due to motion, further bandwidth savings may be realized.

Motion estimation algorithms often try to find a motion vector that minimizes sum of absolute differences (SAD) or sum of square differences (SSD) between a target block and a reference block. Such algorithms are however sensitive to global illumination changes, which may occur for example with fade-in and fade-out video effects, changes of lighting conditions, etc.

The H.264/AVC video coding standard offers a weighted prediction (WP) tool that enables the encoder to scale or offset the reference frame, in order to make it more similar to the target frame, and thus reduce the residual. This process involves multiplying reference image pixels' values by a weighting coefficient (a multiplicative term) and adding an offset (an additive term). Several algorithms exist that find linear prediction coefficients by minimizing a global distance measure between target image levels and linearly transformed reference image levels. Usually L1 (least absolute deviation) or L2 (least squares) norms are used as the distance measure.

Often, some pixels in the target picture or reference picture will exceed their maximum or minimum possible values; this is called saturation. For example, since an imaging device has a limited dynamic range, overly lit pixels may hit a maximum luma value that can be assigned, and overly dark pixels may hit a minimum luma value that can be assigned. Existing weighted prediction coefficients estimation techniques do not consider the saturation phenomenon, and therefore yield a suboptimal estimation of coefficients. Suboptimal coefficients estimation eventually results in worse motion estimation accuracy and larger video bit stream size.

The process of weighted prediction coefficients estimation, i.e. estimating the weight and offset of the reference frame, in conditions where saturation occurs, therefore needs to be addressed. Embodiments of the present invention enable improved weighted prediction coefficients estimation by accounting for the saturation phenomenon.

SUMMARY OF THE EMBODIMENTS

Systems, methods, and computer program products for saturation insensitive weighted prediction coefficients estimation are disclosed and claimed herein.

As described more fully below, the apparatus and processes of the embodiments disclosed permit weighted prediction coefficients estimation even when saturation conditions occur. Further aspects, objects, desirable features, and advantages of the apparatus and methods disclosed herein will be better understood and apparent to one skilled in the relevant art in view of the detailed description and drawings that follow, in which various embodiments are illustrated by way of example. It is to be expressly understood, however, that the drawings are for the purpose of illustration only and are not intended as a definition of the limits of the claimed invention.

Describing the present invention in terms of an exemplary method embodiment, the method comprises first excluding the saturated pixels in frames of an input video from consideration in estimating weighted prediction coefficients, then using the coefficients to encode the input video. The saturated pixels include those having luma and/or chroma values above or below limits, and may be identified by use of a histogram. The saturated pixels may also be found by analyzing a lower resolution version of the frames, and/or sampling pixels in the frames. Video quality is improved for a given bit rate, and coding efficiency is increased, particularly for input video including frames with rapid pixel value changes, which are often due to illumination changes. Separate portions of the frames may be processed separately. The embodiment may execute within an optimization loop that minimizes a predetermined error function. The encoding format may include the H.264/AVC standard.

In a system embodiment, a processor executes instructions stored in a memory to perform the improved encoding methodology.

In a computer program product embodiment, a machine-readable medium tangibly embodies non-transitory program instructions thereon that, when executed by the machine, cause the machine to exclude at least some of the saturated pixels in frames of an input video from consideration in estimating weighted prediction coefficients, and encode the input video using the estimated weighted prediction coefficients.

DETAILED DESCRIPTION OF EXEMPLARY EMBODIMENTS

Embodiments of the present invention provide a new and patentably distinct methodology to obtain weighted prediction coefficients that are better suited for global lighting change compensation for non-saturated regions. Only these regions can benefit from motion compensation, since saturated regions contain no useful picture details. The new methodology allows resulting video bit stream size to be reduced. Alternately, for a constant bit rate video, the video quality is improved.

Embodiments of the present invention may especially improve coded video quality in scenes with rapid lighting condition changes, such as a room with lights being turned on or off, a scene in which a flash is occasionally used (e.g. from some other photographic camera), recording in flickering light conditions, recording a clip at a discotheque, etc. The present invention is described in terms of embodiments for luma weighted prediction coefficients estimation, but is also applicable for chroma levels.

Figure 1:
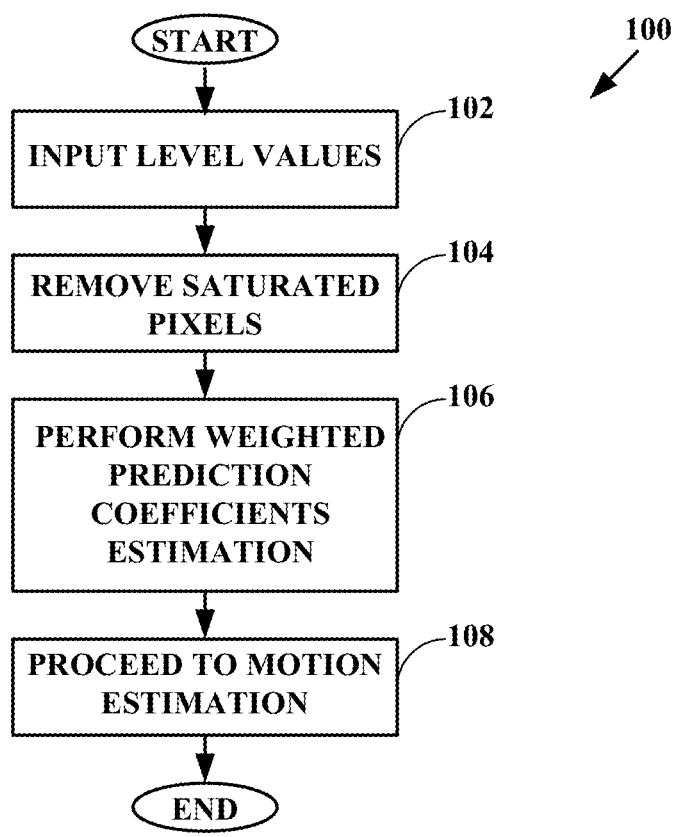
FIG. 1 depicts a diagram of the basic operation of the present invention according to an embodiment.

Referring now to FIG. 1, a diagram of the basic operation is shown according to an embodiment. In step 102, pixel values (e.g. luma or chroma) are input from an image source, typically but not necessarily a video camera. In step 104, saturated pixels are removed from consideration, in a manner to be detailed below. In step 106, weighted prediction coefficients estimation is performed on the pixels under consideration. Finally, in step 108 the coding process proceeds to motion estimation.

The removal of saturated pixels from consideration in the coding process is now described. Although the description is in terms of processing all the pixels in a frame, the invention also encompasses processing only a subset of the pixels. For example, a lower resolution version of a frame may be initially processed, to find regions of high saturation quickly and with less initial memory usage. Alternately, a checkerboard or other pattern of image sampling may be used to identify saturated regions. Separate generation of weighted prediction coefficients estimation for parts of a frame is also within the scope of the invention.

Let N be the number of pixels in a target or reference frame. Let $$R = \{r_i\}_{i=1}^{N},$$

$$T = \{t_i\}_{i=1}^{N}$$

be sets of level values for reference pictures and target pictures respectively, sorted by level value magnitude. Let L, U be the lowest and highest possible level values, respectively.

Define $k_{Lsat}, N_{Usat}$ to be a maximum number of lowest and highest saturated pixel count between reference and target frames:

$$N_{Lsat} = \max\{|\{r \mid r \in R, r = L\}|, |\{t \mid t \in T, t = L\}|\}$$

$$N_{Usat} = \max\{|\{r \mid r \in R, r = U\}|, |\{t \mid t \in T, t = U\}|\}$$

Now define new sets of pixels $$\tilde{R} = \{r_i\}_{i=1+N_{Lsat}}^{N-N_{Rsat}},$$

$$\tilde{T} = \{t_i\}_{i=1+N_{Lsat}}^{N-N_{Rsat}},$$

from reference and target pictures that exclude lowest-level and highest-level saturated pixels. It is assumed that a global lighting change does not change the ordering of for example luma values of pixels. For example, if illumination level is increased between a reference frame and a target frame (the target frame is acquired after the reference frame), and in the target frame there are 20 saturated pixels, then 20 pixels in the reference frame that have the highest level values are excluded from R to produce $\tilde{R}$ The same argument holds for lowest saturated pixels and decreases in illumination level.

The weighted prediction coefficients can be now estimated in step 106 using $\tilde{R}, \tilde{T}$ sets (i.e. those pixels not deemed to be saturated) using existing weighted prediction coefficient estimation algorithms. Motion estimation (in step 108) and subsequent coding processing may follow as is known in the art.

Figure 2:
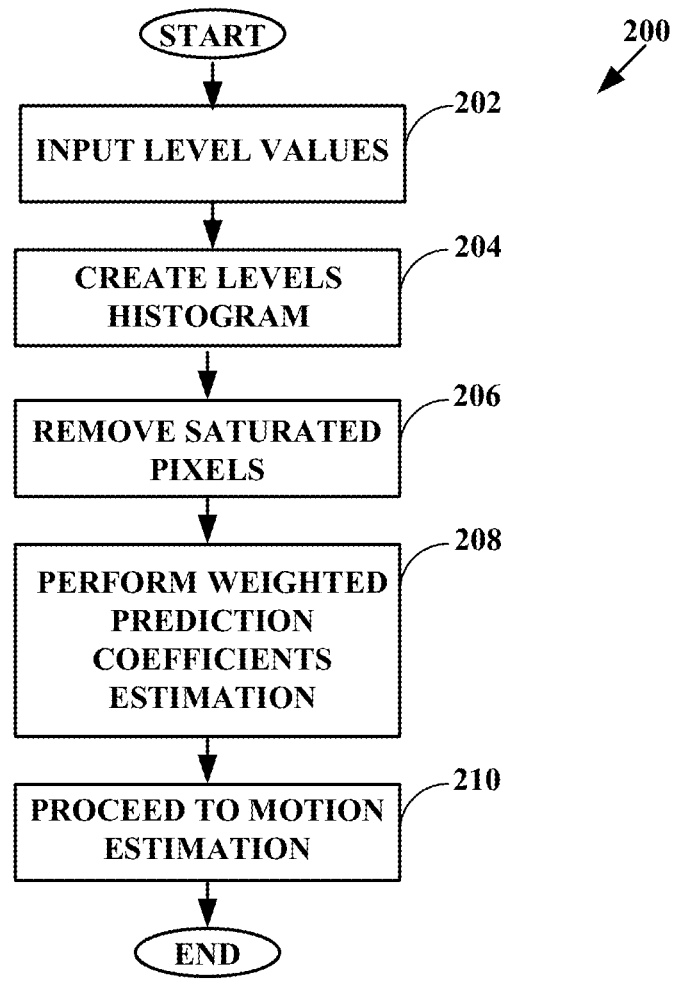
FIG. 2 depicts a diagram of the basic operation of the present invention according to an alternate embodiment.

Referring now to FIG. 2, a diagram of the basic operation is shown according to an alternate embodiment. In this particular implementation, the algorithm may be adapted to operate on histograms (created in step 204) instead of raw level values as previously described. Due to a limited number of available level values (usually 256), sorted sets R,T may be implemented, for example, as a histogram and $\tilde{R}, \tilde{T}$ may be evaluated by removing $N_{Lsat}, N_{Usat}$ elements from the bottom and the top of the histogram, respectively, in step 206. Either a hardware unit or software may be used to create a histogram of R,T values, followed by a unit that excludes $N_{Lsat}, N_{Usat}$ pixels from the bottom/top of the histogram, and executes a standard weighted prediction coefficients estimation algorithm in step 208 and motion estimation in step 210.

Embodiments of the present invention thus resolve the problem faced by prior art solutions, which use all pixels for estimation of weighted prediction coefficients, including saturated pixels that introduce an error into weighted prediction coefficients estimation.

Alternately, a probably significantly more computationally intensive way to implement the methodology would be to use an optimization method to look for optimal weighted prediction parameters by consequently performing motion estimation and residual calculation, and finally selecting optimal weighted prediction coefficients. Such an optimization could use the output of the embodiments previously described as an initial guess, and may operate for a predetermined number of iterations before halting with the best solution then available.

Figure 3:
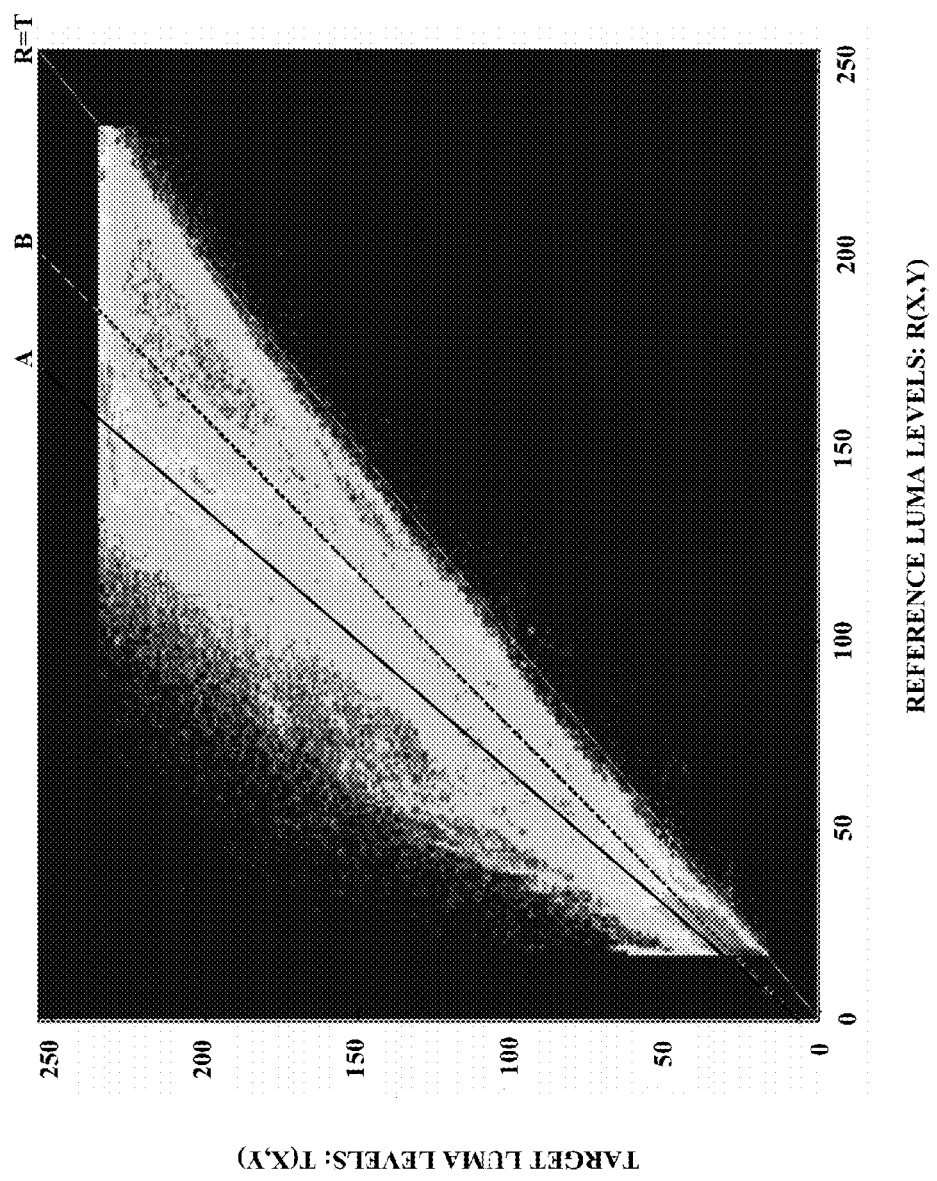
FIG. 3 depicts a histogram of a target levels versus reference levels according to an embodiment.

Referring now to FIG. 3, a histogram of a target levels versus reference levels for an image pair is shown according to an embodiment. Broadly speaking, the generation of weighted prediction coefficients estimates may be viewed as a solution to a regression problem. Let R(x,y) and T(x,y) be for example luma values at (x,y) coordinates of reference picture R and target picture T, respectively. One may construct a 2D histogram using (R(x,y),T(x,y)) pairs, i.e. {(R(x, y),T(x,y))|(x,y) inside the picture}, as shown.

The problem of weighted prediction may be described as that of finding linear coefficients W and B that minimize an error function e, for example:

$$e\_avg = E\{e(W*R(x,y)+B, T(x,y)\}$$

where E is expected value. If the e function is chosen to be for example e(a,b), (a−b)^2, then the least mean squares (LMS) algorithm gives minimal e_avg.

FIG. 3 indicates the result of linear coefficients estimated by embodiments of the present invention's new methodology (shown by solid line A) and by the LMS algorithm (shown by dashed line B). The linear regression function produced by LMS is affected by the "mass" of saturated pixels excluded from consideration by the embodiments of the present invention. Since saturation is not a linear phenomenon, the inclusion of saturated pixels in the regression dataset makes it less usable for illumination compensation purposes.

A primary impact of the various embodiments of the present invention is on the quality of coded video for a given bit rate. Although the embodiments described are currently applied to the H.264 coding scheme, the invention is not so limited, but may also apply to other existing coding schemes. Indeed, it is also likely that subsequent generations of video coding standards will need a similar weighted prediction coefficients feature, and thus the embodiments will be also useful for them.

Figure 4:
FIG. 4 depicts a diagram of a frames from a video clip with increasing saturation effects according to an embodiment.

Embodiments of the present invention may also improve video coding efficiency. Referring now to FIG. 4, sample frames of a test video clip depicting increasing luminance levels and corresponding saturation effects are shown, according to an embodiment. The clip was coded using an identical H.264 video encoder three different times:
  without using weighted prediction,
  using the least mean squares algorithm for estimation of the weighted prediction coefficients, and
  using the new methodology according to embodiments of the present invention for estimation of the weighted prediction coefficients.

Figure 5:
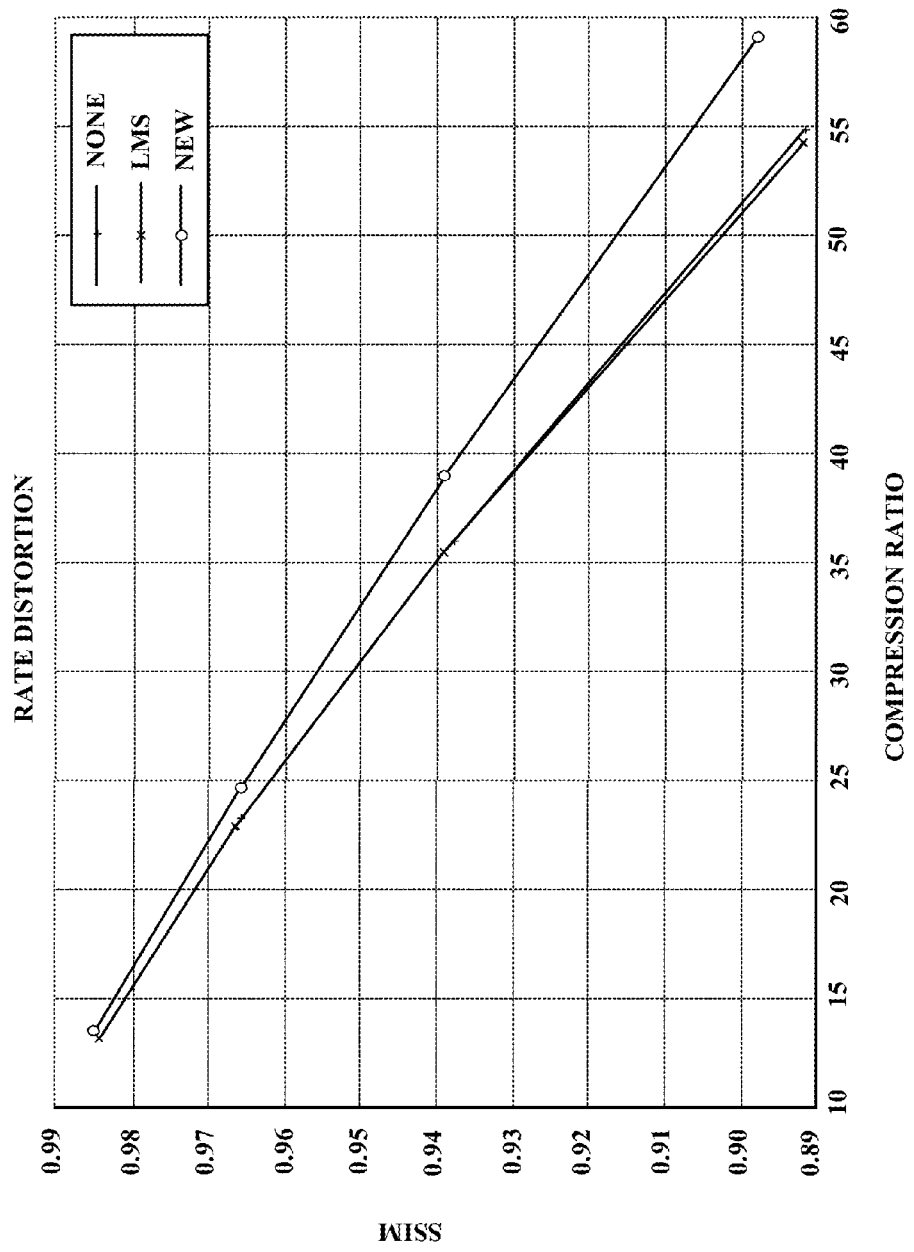
FIG. 5 depicts a diagram of a image quality versus compression ratio according to an embodiment.

FIG. 5 depicts a rate distortion curve, or diagram of a image quality versus compression ratio, according to an embodiment. Compression ratio is shown on the horizontal axis and a picture quality measure (structural similarity index or SSIM) is shown on the vertical axis. For a fixed quality of the encoded clip (e.g. SSIM=0.94), the least mean squares algorithm is not effective (i.e. the compression ratio is the same as without weighted prediction), while embodiments of the present invention implementing the new methodology yield about a 10% improvement in compression ratio.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with the practices of persons skilled in the art of computer programming, embodiments are described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the embodiments are essentially the code segments to perform the necessary tasks. The non-transitory code segments may be stored in a processor readable medium or computer readable medium, which may include any medium that may store or transfer information. Examples of such media include an electronic circuit, a semiconductor memory device, a read-only memory (ROM), a flash memory or other non-volatile memory, a floppy diskette, a CD-ROM, an optical disk, a hard disk, a fiber optic medium, etc. User input may include any combination of a keyboard, mouse, touch screen, voice command input, etc. User input may similarly be used to direct a browser application executing on a user's computing device to one or more network resources, such as web pages, from which computing resources may be accessed.

While the invention has been described in connection with specific examples and various embodiments, it should be readily understood by those skilled in the art that many modifications and adaptations of the invention described herein are possible without departure from the spirit and scope of the invention as claimed hereinafter. Thus, it is to be clearly understood that this application is made only by way of example and not as a limitation on the scope of the invention claimed below. The description is intended to cover any variations, uses or adaptation of the invention following, in general, the principles of the invention, and including such departures from the present disclosure as come within the known and customary practice within the art to which the invention pertains.

What is claimed is:

1. A processor-implemented method, comprising:
  determining saturated pixels in frames of an input video, wherein the saturated pixels include those pixels having at least one of luma values over an upper luma value limit, luma values under a lower luma value limit, chroma values over an upper chroma value limit, and chroma values under a lower chroma value limit;
  removing the determined saturated pixels from consideration in estimating weighted prediction coefficients;
  estimating the weighted prediction coefficients based on the pixels remaining after removing the determined saturated pixels from consideration; and
  encoding the input video using the estimated weighted prediction coefficients.

2. The method of claim 1 wherein the saturated pixels are identified by use of a histogram.

3. The method of claim 1 wherein the saturated pixels are identified by analyzing a lower resolution version of the frames.

4. The method of claim 1 wherein the saturated pixels are identified by sampling pixels in the frames.

5. The method of claim 1 wherein the input video comprises frames with rapid pixel value changes including at least one of rapid luma value changes and rapid chroma value changes.

6. The method of claim 1 further comprising performing the excluding and encoding on separate portions of the frames.

7. The method of claim 1 further comprising performing the excluding and encoding in an optimization loop that minimizes a predetermined error function.

8. The method of claim 1 wherein the encoding comprising H.264/AVC encoding.

9. The method of claim 1 wherein encoded video quality is increased for a given bit rate.

10. The method of claim 1 wherein coding efficiency is increased.

11. A computer program product comprising a non-transitory machine-readable medium tangibly embodying non-transitory program instructions thereon that, when executed by the machine, cause the machine to:
   determining saturated pixels in frames of an input video, wherein the saturated pixels include those pixels having at least one of luma values over an upper luma value limit, luma values under a lower luma value limit, chroma values over an upper chroma value limit, and chroma values under a lower chroma value limit;
   removing the determined saturated pixels from consideration in estimating weighted prediction coefficients;
   estimating the weighted prediction coefficients based on the pixels under consideration; and
   encode the input video using the estimated weighted prediction coefficients.

12. A system, comprising:
   means for determining saturated pixels in frames of an input video, wherein the saturated pixels include those pixels having at least one of luma values over an upper luma value limit, luma values under a lower luma value limit, chroma values over an upper chroma value limit, and chroma values under a lower chroma value limit;
   means for removing the determined saturated pixels from consideration in estimating weighted prediction coefficients;
   means for estimating the weighted prediction coefficients based on the pixels under consideration; and
   means for encoding the input Video using the estimated weighted prediction coefficients.

13. A system, comprising:
   a processor; and a memory that stores instructions, the processor instruction execution causing the processor to:
   determine saturated pixels in frames of an input video, wherein the saturated pixels include those pixels having at least one of luma values over an upper luma value limit, luma values under a lower luma value limit, chroma values over an upper chroma value limit, and chroma values under a lower chroma value limit;
   remove the determined saturated pixels from consideration in estimating weighted prediction coefficients;
   estimate the weighted prediction coefficients based on the pixels under consideration; and
   encode the input video using the estimated weighted prediction coefficients.

14. The system of claim 13 wherein the saturated pixels are identified by use of a histogram.

15. The system of claim 13 wherein the saturated pixels are identified by analyzing a lower resolution version of the frames.

16. The system of claim 13 wherein the saturated pixels are identified by sampling pixels in the frames.

17. The system of claim 13 wherein the input video comprises frames with rapid pixel value changes including at least one of rapid luma value changes and rapid chroma value changes.

18. The system of claim 13 further comprising performing the excluding and encoding on separate portions of the frames.

19. The system of claim 13 further comprising performing the excluding and encoding in an optimization loop that minimizes a predetermined error function.

20. The system of claim 13 wherein the encoding comprises H.264/AVC encoding.

21. The system of claim 13 wherein encoded video quality is increased for a given bit rate.

22. The system of claim 13 wherein coding efficiency is increased.

23. The method of claim 1 wherein the estimating comprises determining a plurality of coefficients which minimize an error function, the error function representing a distance-measure between the pixels of sequential frames.

* * * * *